(12) United States Patent
Abe

(10) Patent No.: US 10,904,399 B2
(45) Date of Patent: Jan. 26, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Noriyuki Abe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/530,235

(22) Filed: Aug. 2, 2019

(65) Prior Publication Data

US 2020/0304648 A1    Sep. 24, 2020

(30) Foreign Application Priority Data

Mar. 19, 2019 (JP) .................................. 2019-050727

(51) Int. Cl.
*H04N 1/00* (2006.01)
*G06F 3/12* (2006.01)

(52) U.S. Cl.
CPC ......... *H04N 1/00029* (2013.01); *G06F 3/121* (2013.01); *G06F 3/1229* (2013.01); *H04N 1/00037* (2013.01); *H04N 1/00076* (2013.01)

(58) Field of Classification Search
CPC ........... H04N 1/00029; H04N 1/00037; H04N 1/00076; G06F 3/121; G06F 3/1229; G06F 11/3055; G06F 3/1234; G06Q 10/0635
See application file for complete search history.

(56) References Cited

U.S. PATENT DOCUMENTS

| | | | | |
|---|---|---|---|---|
| 2003/0076524 A1* | 4/2003 | Wanda | ................ | G06F 3/1205 358/1.14 |
| 2009/0002754 A1* | 1/2009 | Kim | .................... | G06Q 10/063 358/1.15 |
| 2016/0233985 A1* | 8/2016 | Ando | ................... | G06F 11/327 |

FOREIGN PATENT DOCUMENTS

| | | |
|---|---|---|
| JP | 4231215 B2 | 2/2009 |
| JP | 2017-199128 A | 11/2017 |

\* cited by examiner

*Primary Examiner* — Iriana Cruz
(74) *Attorney, Agent, or Firm* — Oliff PLC

(57) ABSTRACT

An information processing apparatus includes a priority setting unit configured to set the lowest failure recovery priority for devices belonging to a first group for which it is not possible to determine how to recover from failures, among devices in which the failures have occurred, and set a failure recovery priority higher than the lowest failure recovery priority, for devices belonging to a second group for which it is possible to determine how to recover from the failures, among the devices in which the failures have occurred.

13 Claims, 14 Drawing Sheets

215

| POWER SUPPLY IS NOT AVAILABLE | IT TAKES Y HOURS OR MORE TO SPECIFY PARTS | REPAIR TIME IS X HOURS OR MORE | PRIORITY |
|---|---|---|---|
| ○ | — | — | LOWEST |
| — | ○ | — | LOWEST |
| — | — | ○ | LOWEST |

FIG. 3

| DEVICE ID | STATUS | FAILURE OCCURRENCE DATE AND TIME | ERROR CODE | FAILURE DETAILS | NOTIFICATION SCHEDULED TIME |
|---|---|---|---|---|---|
| M003 | NORMAL | — | — | — | 9:15 |
| M004 | FAILURE OCCURRING | 2017/08/08 10:15 | E0010 | CPU FAILURE | 17:30 |
| ... | ... | ... | ... | ... | 15:20 |

| DEVICE ID | STATUS | FAILURE OCCURRENCE DATE AND TIME | ERROR CODE | FAILURE DETAILS | STATUS CONFIRMATION |
|---|---|---|---|---|---|
| M004 | FAILURE OCCURRING | 2017/08/08 10:15 | E0010 | CPU FAILURE | NOT YET |
| ... | ... | ... | ... | ... | ... |

| DEVICE ID | STATUS | NOTIFICATION SCHEDULED TIME |
|---|---|---|
| ... | ... | ... |

| DEVICE ID | FAILURE OCCURRENCE DATE AND TIME | ERROR CODE | FAILURE DETAILS | STATUS CONFIRMATION | DISPATCHED CE |
|---|---|---|---|---|---|
| ... | ... | ... | ... | ... | ... |

| POWER SUPPLY IS NOT AVAILABLE | IT TAKES Y HOURS OR MORE TO SPECIFY PARTS | REPAIR TIME IS X HOURS OR MORE | PRIORITY |
|---|---|---|---|
| ○ | — | — | LOWEST |
| — | ○ | — | LOWEST |
| — | — | ○ | LOWEST |

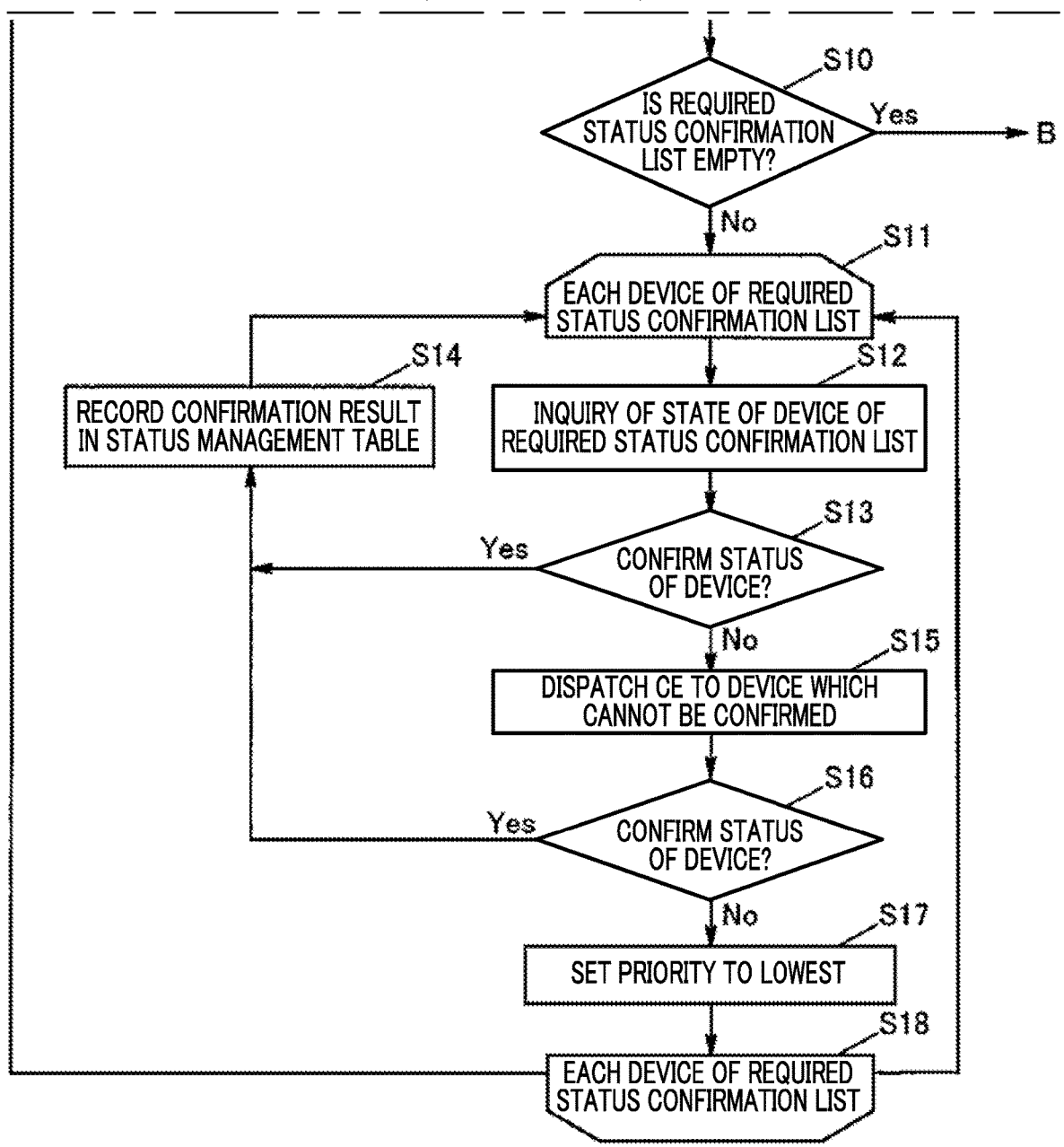

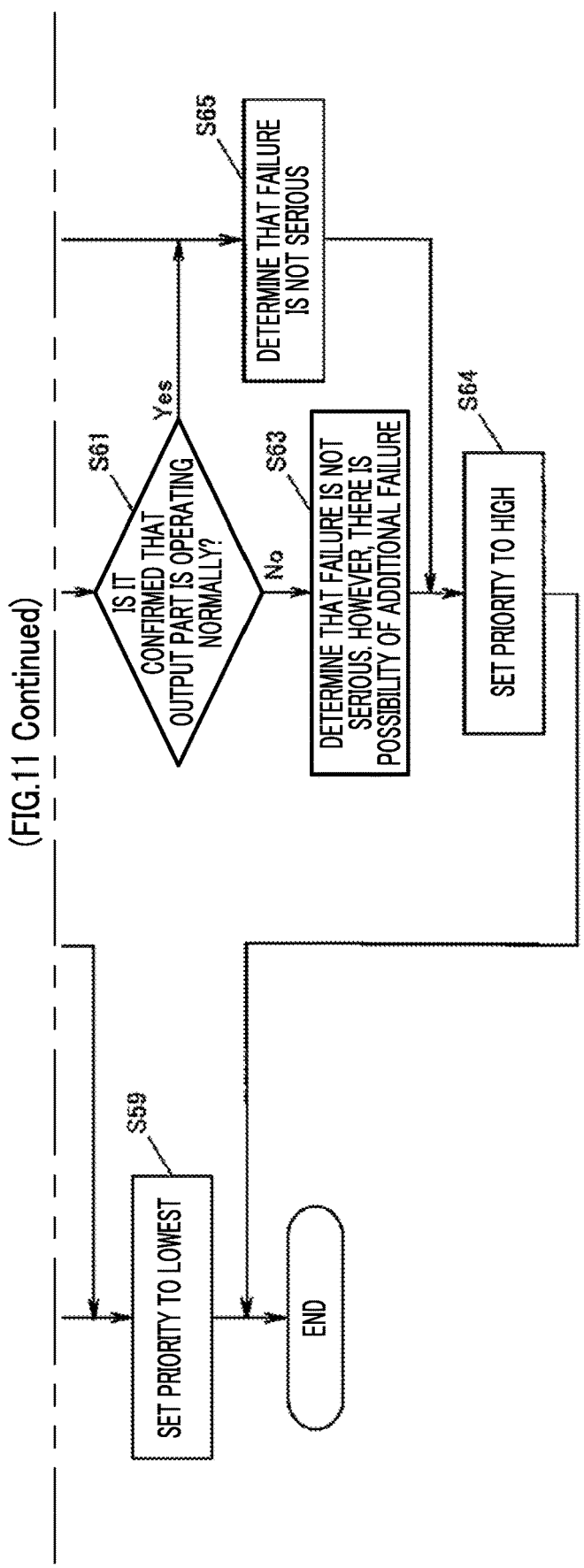

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-050727 filed Mar. 19, 2019.

BACKGROUND

(i) Technical Field

The present disclosure relates to an information processing apparatus and a non-transitory computer readable medium.

(ii) Related Art

In recent years, a customer-engineer dispatch system has been proposed in which a customer engineer is dispatched efficiently in response to a device failure (see, for example, Japanese Patent No. 4231215).

The customer-engineer dispatch system described in Japanese Patent No. 4231215 includes a dispatch determination unit that selects a customer engineer to be dispatched according to the content of the failure of a device without setting a failure recovery priority among devices, based on the failure information of the device deployed for the customer and/or the customer-engineer dispatch request information.

SUMMARY

Aspects of non-limiting embodiments of the present disclosure relate to an information processing apparatus and a non-transitory computer readable medium capable of preferentially recovering a device which is to be recovered from a failure compared to a case where the limited number of maintenance personnel handle all devices in which failures have occurred.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a priority setting unit configured to set the lowest failure recovery priority for devices belonging to a first group for which it is not possible to determine how to recover from failures, among devices in which the failures have occurred, and set a failure recovery priority higher than the lowest failure recovery priority, for devices belonging to a second group for which it is possible to determine how to recover from the failures, among the devices in which the failures have occurred.

BRIEF DESCRIPTION OF THE DRAWINGS

Exemplary embodiments of the present disclosure will be described in detail based on the following figures, wherein:

FIG. 3 is a diagram showing an example of a device status management table;

FIG. 4 is a diagram showing an example of a required status confirmation list;

FIG. 5 is a diagram showing an example of a notification waiting device list;

FIG. 6 is a diagram showing an example of a CE dispatch target device list;

FIG. 7 is a diagram showing an example of a priority determination table;

DETAILED DESCRIPTION

Figure 1:
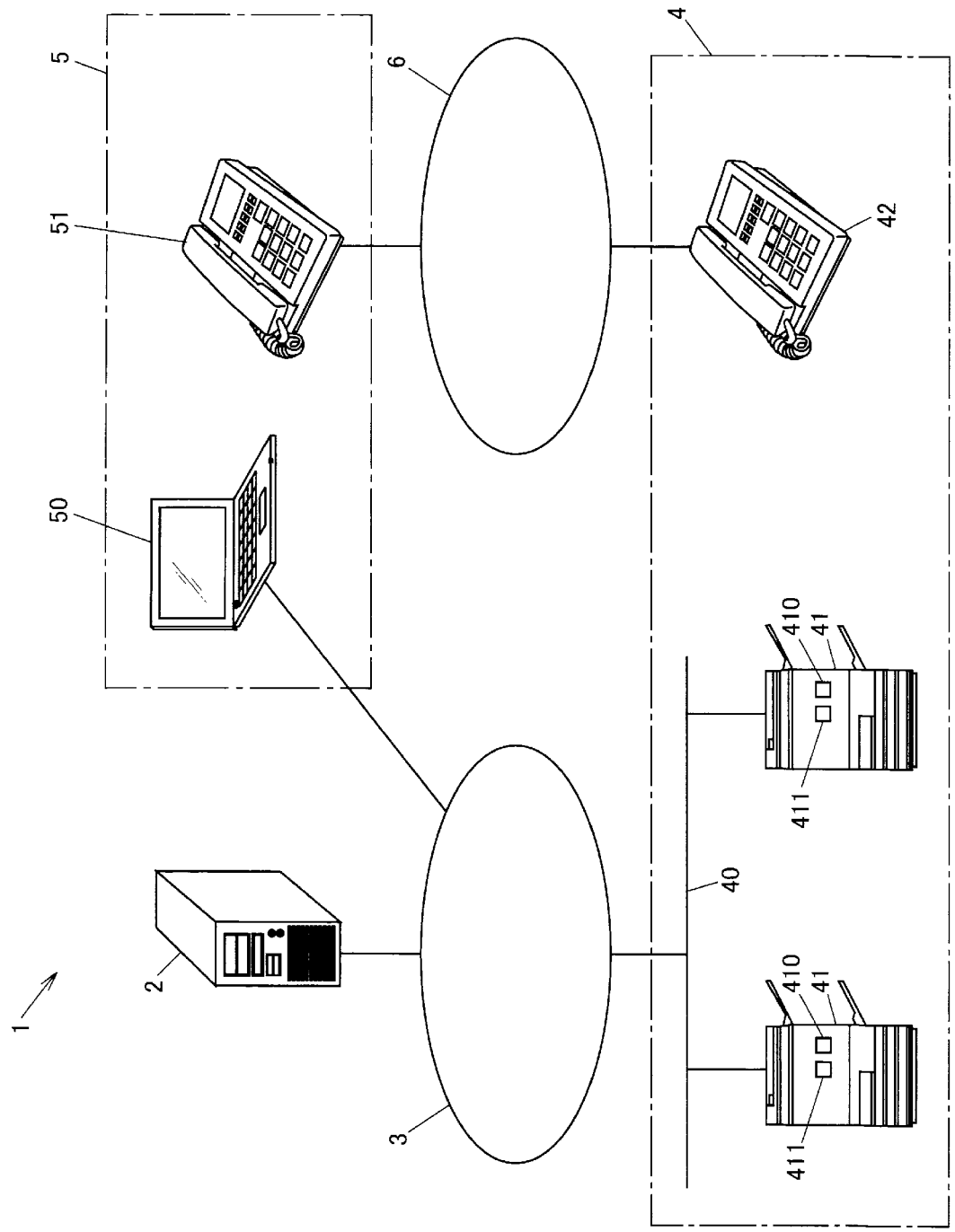
FIG. 1 is a block diagram showing a configuration example of an information processing system according to an exemplary embodiment of the present disclosure.

Hereinafter, embodiments of the present disclosure will be described with reference to drawings. In the drawings, components having substantially the same function are denoted by the same reference numerals, and redundant description will be omitted.

Summary of Exemplary Embodiment

An information control apparatus according to an exemplary embodiment includes a priority setting unit configured to set the lowest failure recovery priority for devices belonging to a first group for which it is not possible to determine how to recover from failures, among devices in which the failures have occurred, and set a failure recovery priority higher than the lowest failure recovery priority, for devices belonging to a second group for which it is possible to determine how to recover from the failures, among the devices in which the failures have occurred.

The case where it is not possible to determine how to recover from failures means a case where it is not possible to determine how to recover from the failures because the situation of the failures is not known or the scheduled time of a periodic notification has not been reached. The case where it is possible to determine how to recover from the failures means a case where it is possible to determine how to recover from the failures because the situation of the failures is known. Even in a case where it is possible to determine how to recover from a failure, it may take time to recover due to circumstances, for example, it takes a time to obtain parts for recovery. In such a case, the priority may be set to the lowest priority. The priority may be two levels of high and low, three of high, medium, and low or more levels. In these cases, the low priority is the lowest priority.

Exemplary Embodiment

FIG. 1 is a diagram showing a configuration example of an information processing system according to the exemplary embodiment of the present disclosure. An information processing system 1 includes an information processing apparatus 2, plural devices 41 and telephones 42 disposed in a management area 4, and a call center terminal 50 and a telephone 51 that are disposed in a call center 5. In FIG. 1, one management area 4 is shown. Alternatively, plural management areas 4 may be provided. In addition, in FIG. 1, plural devices 41 are disposed in the management area 4. Alternatively, one device 41 may be provided.

The plural devices 41 are connected to the information processing apparatus 2 via an internal network 40 and an external network 3. The telephone 42 disposed in the management area 4 is connected to the telephone 51 of the call center 5 via a public telephone network 6.

The external network 3 is, for example, a communication network such as the Internet. The internal network 40 is, for example, a communication network such as a local network (LAN).

The information processing apparatus 2 provides a maintenance and management service for the device 41 disposed in the management area 4. For example, the information processing apparatus 2 provides a service for dispatching maintenance personnel to recover a failure when the failure occurs. Maintenance personnel include, for example, customer engineers (CE), system engineers (SE), and the like. In the present exemplary embodiment, a CE will be described as maintenance personnel.

(Configuration of Device)

The device 41 is, for example, an image forming apparatus having plural functions such as scanning, printing, copying, electronic mail, and faxing. The device 41 may be an image forming apparatus having a single function such as a printer or a facsimile. The device 41 is not limited to the image forming apparatus and may be an information processing terminal such as a multi-function mobile phone (smart phone), a personal computer (PC), a tablet terminal, and the like.

The device 41 includes a failure detection unit 410 and an aggregation unit 411. The failure detection unit 410 monitors the internal operation state of the device 41 to detect the occurrence of a failure. When detecting the occurrence of a failure, the failure detection unit 410 transmits an error code corresponding to the content of the detected failure and the detected date and time together with a device ID for identifying the device 41 as failure information to the information processing apparatus 2 via the internal network 40 and the external network 3. The error code is identification information such as a number or a symbol for identifying the content of the failure. In addition, in a case where the failure detection unit 410 can diagnose the status of the device 41 when a failure occurs, the failure detection unit 410 transmits the status as diagnostic data to the information processing apparatus 2.

The aggregation unit 411 aggregates information (for example, the number of printed sheets, and the like) indicating the usage status of the device 41 and transmits the aggregated information to the information processing apparatus 2 as a periodic notification (hereinafter, also referred to as a periodic notification) at a set time.

(Configuration of Information Processing Apparatus)

Figure 2:
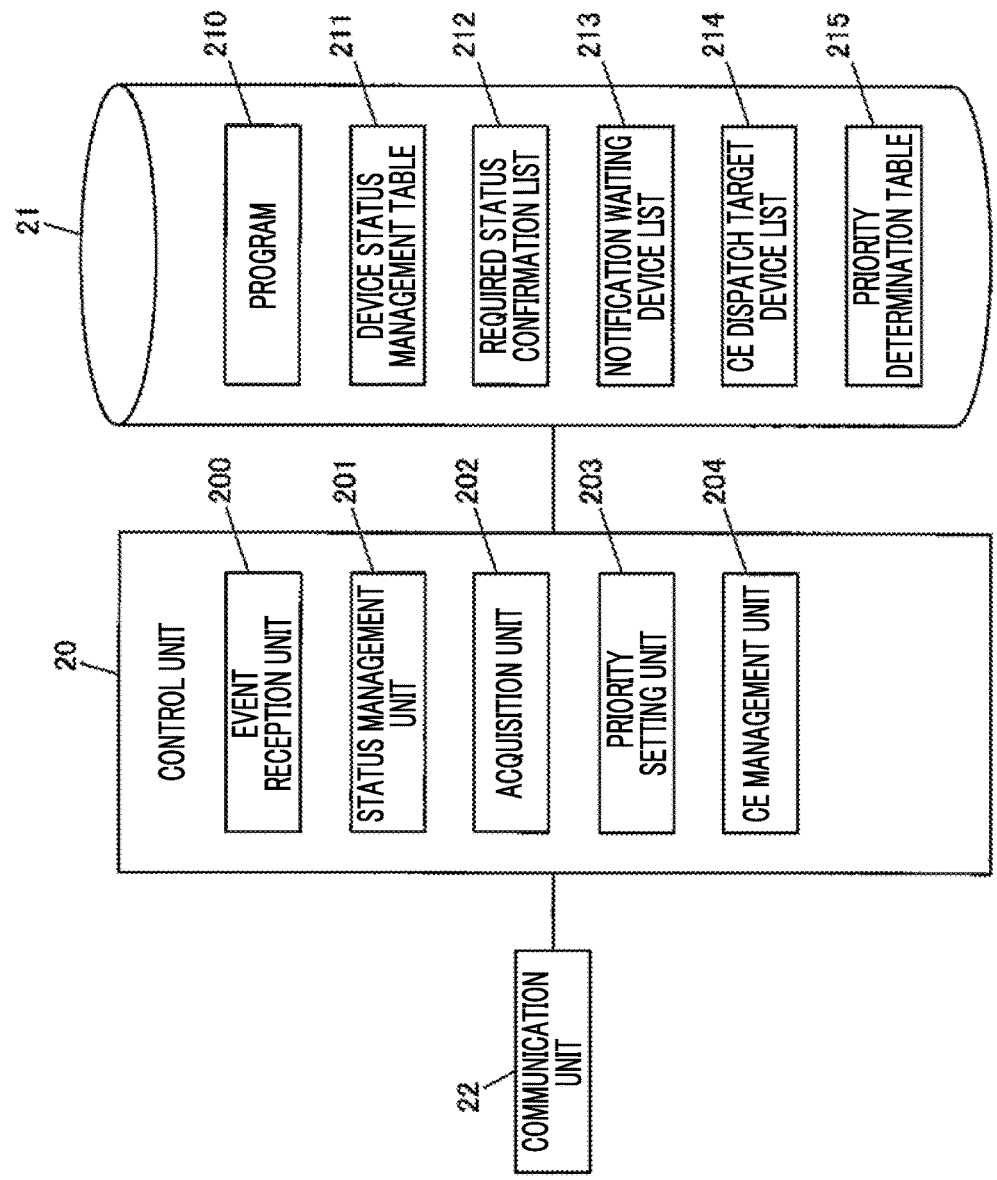
FIG. 2 is a block diagram showing an example of a control system of an information processing apparatus.

FIG. 2 is a block diagram showing an example of a control system of the information processing apparatus 2. The information processing apparatus 2 includes a control unit 20 that controls each unit of the information processing apparatus 2, a storage unit 21, and a communication unit 22.

The control unit 20 is configured with a central processing unit (CPU), an interface, and the like. The CPU operates according to a program 210 stored in the storage unit 21 to function as an event reception unit 200, a status management unit 201, an acquisition unit 202, a priority setting unit 203, a CE management unit 204, and the like. The details of each of the units 200 to 204 will be described later. The CE management unit 204 is an example of a dispatch unit.

The storage unit 21 is configured with a read only memory (ROM), a random access memory (RAM), a hard disk, and the like and stores various types of information such as the program 210 as shown in the flowcharts of FIGS. 8 to 11 and a device status management table 211 (see FIG. 3), a required status confirmation list 212 (see FIG. 4), a notification waiting device list 213 (see FIG. 5), a CE dispatch target device list 214 (see FIG. 6), a priority determination table 215 (see FIG. 7), and the like. Information stored in the priority determination table 215 shown in FIG. 7 is an example of a condition.

The communication unit 22 communicates with the call center terminal 50 via the external network 3 and communicates with the device 41 via the external network 3 and the internal network 40.

FIG. 3 is a diagram showing an example of the device status management table 211. The device status management table 211 has items such as device ID, status, failure occurrence date and time, error code, failure details, notification scheduled time, and the like. The device status management table 211 is recorded by the status management unit 201. The device ID for identifying the device 41 is recorded in the device ID. The status (normal, failure occurring, status unknown, and the like) of the device 41 is recorded in the status. In the failure occurrence date and time, the date and time when the failure included in the failure information transmitted from the device 41 is detected is recorded as the failure occurrence date and time. The failure details are details of the failure corresponding to the error code. The failure details includes, for example, a CPU failure, a memory failure, an HDD failure, and the like. Notification scheduled time is recorded as scheduled time of a periodic notification. Usually, the devices 41 are dispersed so as not to have the same time.

FIG. 4 is a diagram showing an example of the required status confirmation list 212. The required status confirmation list 212 has items such as device ID, status, failure occurrence date and time, error code, failure details, and status confirmation. The status management unit 201 records information of the device 41 whose status is to be confirmed in the required status confirmation list 212. The items of the device ID, the status, failure occurrence date and time, error code, and failure details have the same meaning as described in FIG. 3. In the item of the status confirmation, "done" is recorded in a case where the status is confirmed, and "not yet" is recorded in a case where the status is not confirmed.

FIG. 5 is a diagram showing an example of the notification waiting device list 213. The notification waiting device list 213 has items such as device ID, status, and notification scheduled time. In the notification waiting device list 213, the information of the device 41 waiting for a periodic notification is recorded by the status management unit 201. The items of device ID, status, and notification scheduled time have the same meaning as described in FIG. 3.

FIG. 6 is a diagram showing an example of the CE dispatch target device list 214. The CE dispatch target device list 214 has items such as device ID, failure occurrence date and time, error code, failure details, status confirmation, dispatched CE, and the like. In the CE dispatch target device list 214, information on the device 41 to which a CE is dispatched is recorded by the CE management unit 204. The items of the device ID, failure occurrence date and time, error code, and failure details have the same meaning as described in FIG. 3. The item of status confirmation has the same meaning as described in FIG. 4. In the item of dispatched CE, the ID of the dispatched CE is recorded.

FIG. 7 is a diagram showing an example of the priority determination table 215. The priority determination table 215 has items such as (i) power supply is not available, (ii) it takes Y hours or more to specify parts, (iii) repair time is X hours or more, priority, and the like. Y hours and X hours are examples of a predetermined time. If the device falls to any or plural ones of items including (i) supply power is not available, (ii) it takes Y hours or more to specify parts, and (iii) repair time is X hours or more, the priority setting unit 203 may set the priority to the lowest priority.

Next, each of the units 201 to 204 of the control unit 20 will be described.

The event reception unit 200 receives a periodic notification from the device 41. In a case where failure information and diagnostic data are transmitted from the device 41, the event reception unit 200 receives the failure information and the diagnostic data. The event reception unit 200 transmits the periodic notification, the failure information, and the diagnostic data received from the device 41 to the status management unit 201.

The status management unit 201 receives the notification from the event reception unit 200, the notification from the call center 5, and the notification from the CE, updates the status of the device 41, and manages the last update date. Further, the status management unit 201 manages an update frequency of the device status management table 211. For example, a device A is regularly updated from 15:00 on Monday to Friday, but there is no update on the weekend.

The priority setting unit 203 classifies the devices 41 in which a failure has occurred into (i) a group in which the status of the failure has not been confirmed, that is, a first group for which it is not possible to determine how to recover from a failure and (ii) a group in which the status of the failure has been confirmed, that is, a second group for which it is possible to determine how to recover from the failure.

For example, the priority setting unit 203 sets the lowest failure recovery priority for the devices 41 belonging to the first group, and sets a failure recovery priority higher than the lowest priority for the devices 41 belonging to the second group. The device 41 for which a priority higher than the lowest priority is set is an example of a device to be preferentially recovered.

In any of the following cases, the failure recovery priority of one or more devices 44 may be set to the lowest priority.

(a) In a case where there is no periodic notification even if the scheduled time of a periodic notification from a device 41 belonging to the first group has passed.

(b) In a case where the status of a device 41 belonging to the first group cannot be confirmed (for example, in a case where the status of the device 41 belonging to the first group cannot be confirmed even if the CE is dispatched).

(c) In a case where the status of a device 41 belonging to the first group is confirmed, and in the case where it is confirmed that there is no other device 41 in which a failure has occurred in the same management area 4 as the device 41.

(d) In a case where the number of devices 41 belonging to the second group exceeds the number of devices CEs can immediately deal with (in this case, the lowest priority may be set for devices the number of which corresponds to excess of the number of devices 41 belonging to the second group over the number of devices that CEs can immediately deal with).

(e) In a case where the severity of a failure of a device 41 belonging to the second group satisfies a predetermined condition.

The predetermined condition may be, for example, any of the followings.

(i) In a case where power supply to the device 41 is not available.

(ii) In a case where the recovery time of the device 41 is predicted to be equal to or greater than a predetermined time.

(f) In a case where the use frequency of a device 41 belonging to the second group is equal to or less than a threshold.

When the scheduled time at which a periodic notification is made from a device 41 among the devices 41 belonging to the first group has not reached, the priority setting unit 203 may set, for the device 41, a higher priority than the lowest priority or a priority different from the lowest priority. The priority different from the lowest priority means a priority that is higher or a priority outside a priority list.

The priority setting unit 203 notifies the CE management unit 204 of the priority set for the device 41 in which the failure has occurred.

The CE management unit 204 may determine the CE dispatch destination in accordance with the priority set by the priority setting unit 203. At that time, the failure level of each device 41 and the skill of CE are matched. That is, the CE management unit 204 excludes the device 41 for which the lowest priority is set by the priority setting unit 203 and determines the dispatch destination in consideration of the skills of the CEs, the amount that can be dealt with, and the like according to the degree of failure, repair time, and the like of another device 41 in which a failure has occurred. In addition, in a case where the severity of the failure of the device 41 belonging to the second group does not satisfy the condition, the CE management unit 204 may determine the dispatch of the CE after waiting for the scheduled time of a periodic notification from another device 41 existing in the same management area 4 as the device 41.

(Operation of Information Processing Apparatus)

Next, an example of the operation of the information processing apparatus 2 will be described.

(1) When Failure Occurs

When the failure detection unit 410 detects the occurrence of a failure, the device 41 transmits failure information and diagnostic data if possible to the information processing apparatus 2 via the internal network 40 and the external network 3. The event reception unit 200 of the information processing apparatus 2 receives the failure information and the diagnostic data transmitted from the device 41 and transmits the failure information and the diagnostic data to the status management unit 201.

When a failure occurs, an error code may not be specified. In addition, the telephone 42 located in the management area 4 may notify the telephone 51 of the call center 5 of the failure status of the device 41. In this case, a receiver operates the call center terminal 50 to transmit call information to the information processing apparatus 2.

(2) Deal with Device Belonging to First Group

Figure 8:
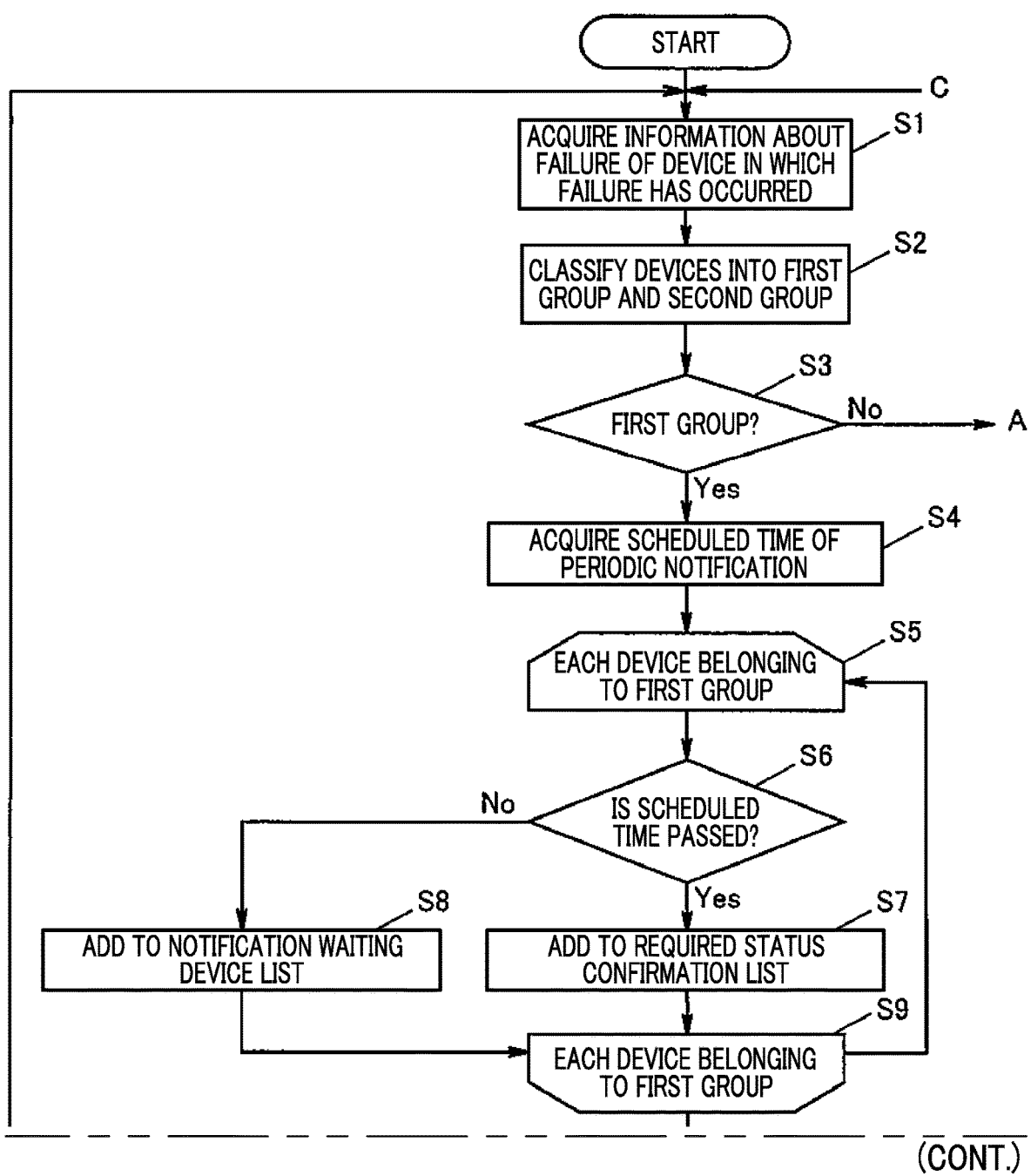
FIG. 8 is a flowchart showing an example of an operation of an information processing apparatus to deal with a device belonging to a first group.

FIG. 8 is a flow chart showing an example of the operation of the information processing apparatus 2 to deal with the devices belonging to the first group.

When the event reception unit 200 of the information processing apparatus 2 receives failure information and diagnostic data, the status management unit 201 records the information and the data in the device status management table 211 as information on the failure. The information related to the failure includes device ID, status, failure occurrence date and time, error code, failure details, and the like.

The acquisition unit 202 acquires information on the device 41 in which a failure has occurred from the device status management table 211 (S1).

The priority setting unit 203 classifies the devices 41 in which the failure has occurred into the first group and the second group (S2).

The priority setting unit 203 determines whether the device 41 belongs to the first group (S3). In a case where the device 41 does not belong to the first group (S3: No), the process proceeds to a flowchart shown in FIG. 9.

In a case where the device 41 belongs to the first group (S3: Yes), the priority setting unit 203 acquires the scheduled time of a periodic notification from the device status management table 211 (S4).

Next, loop processing is performed to add the information of each device 41 belonging to the first group to the required status confirmation list 212 or the notification waiting device list 213 (S5 to S9).

That is, one device 41 is selected from the devices 41 belonging to the first group (S5), and it is determined whether or not a current time has passed the acquired scheduled time (S6). In a case where the scheduled time has passed (S6: Yes), the status management unit 201 adds the information of the device 41 to the required status confirmation list 212 (S7). In a case where the scheduled time has not passed (S6: No), the status management unit 201 adds the information of the device 41 to the notification waiting device list 213 (S8). If loop processing is not completed for all devices 41 belonging to the first group (S9), the process proceeds to step S5, and the next device 41 is selected (S5). If loop processing is completed for all devices 41 (S9), the process proceeds to the next step S10.

It is determined whether or not the required status confirmation list 212 is empty (S10). If the required status confirmation list 212 is empty (S10: Yes), the process proceeds to the flowchart shown in FIG. 10.

If the required status confirmation list 212 is not empty (S10: No), loop processing is performed as to whether or not the status of each device 41 added to the required status confirmation list 212 can be confirmed (S11 to S18).

That is, one device 41 is selected from the required status confirmation list 212 (S11), and an administrator is inquired of the state of the device 41 (S12). For example, the inquiry may be made using the telephone 51 of the call center 5. In a case where the status of the device 41 is confirmed (S13: Yes), the status management unit 201 records the confirmation result in the device status management table 211 (S14). In a case where the status of the device 41 is confirmed (S13: No), the CE management unit 204 determines the dispatch of the CE (S15). In a case where the status is confirmed by the dispatched CE (S16: Yes), the confirmation result is recorded in the device status management table 211 (S14). In a case where the status cannot be confirmed even when the CE is dispatched (S16: No), the priority setting unit 203 sets the lowest failure recovery priority for the device 41 (S17). When the confirmation of the status of all the devices 41 in the required status confirmation list 212 is completed (S18), the process proceeds to step S1.

(3) Deal with Device Belonging to Second Group

Figure 9:
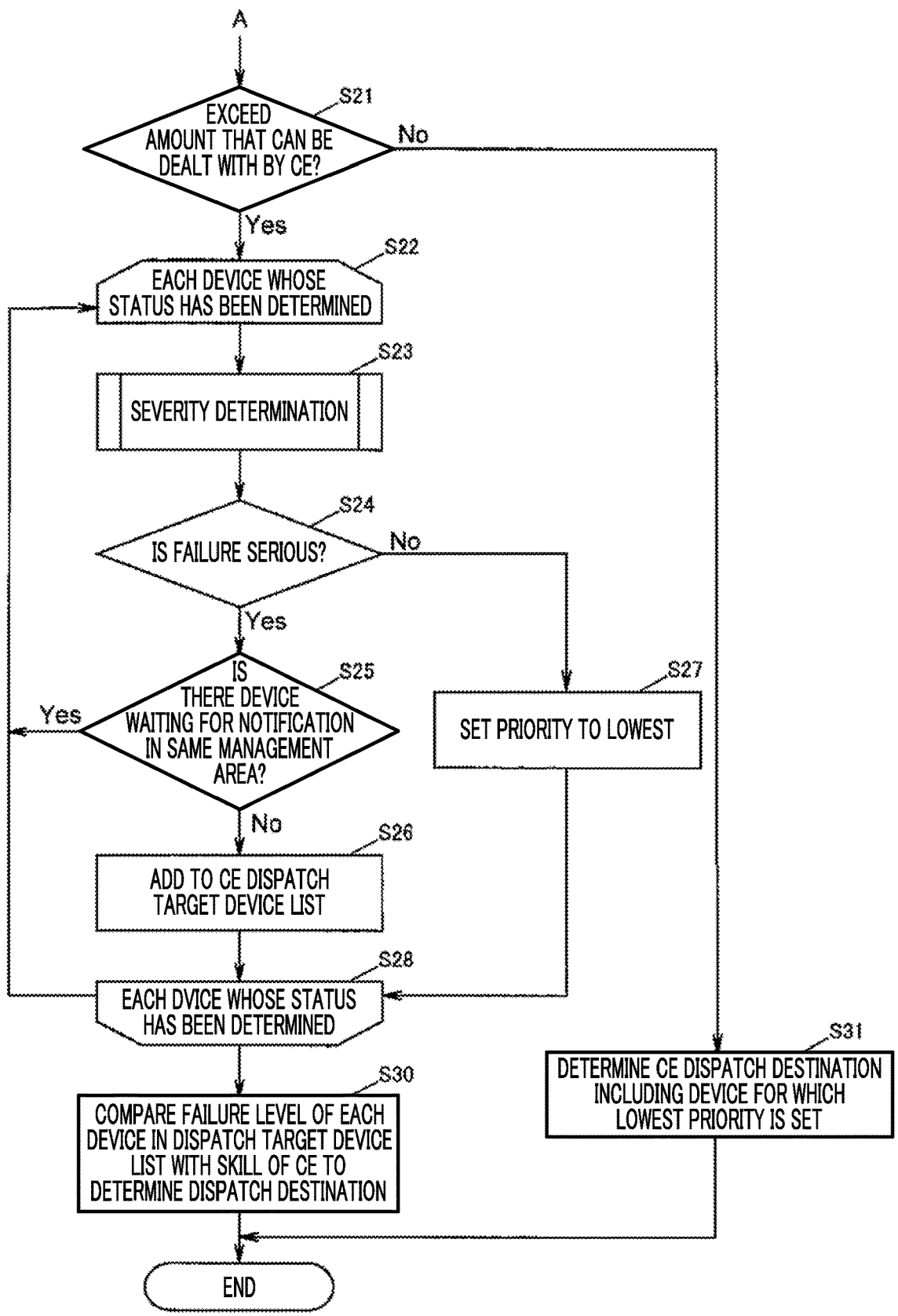
FIG. 9 is a flowchart showing an example of an operation of an information processing apparatus to deal with a device belonging to a second group.

FIG. 9 is a flow chart showing an example of the operation of the information processing apparatus 2 to deal with the devices belonging to the second group.

It is determined whether or not the number of devices whose failure status is determined exceeds an amount that can be dealt with by the CEs, that is, whether the number of devices whose failure status is determined exceeds the number of devices that CEs can immediately deal with (S21). If the amount is exceeded (S21: Yes), loop processing is performed to determine the severity of the failure of the device 41 belonging to the second group (S22 to S28).

That is, the severity determination shown in the flowchart of FIG. 11 described later is performed (S23). If the failure is serious as a result of the severity determination (S24: Yes), it is determined whether or not there is a device 41 waiting for a notification in the same management area 4 (S25). If there is no device 41 waiting for a notification in the same management area 4 (S25: No), the device 41 waiting for a notification is added to the CE dispatch target device list 214 (S26). If the failure is not serious in step S24 (S24: No), the priority is set to the lowest priority (S27). If there is no device whose status has been determined (S28), the process proceeds to the next step.

When the loop processing of steps S22 to S28 is completed, the failure level of each device 41 in the dispatch target device list 214 is compared with the skills of the CEs to determine a dispatch destination (S30).

In step S21, in a case where the amount that the CEs can deal with is not exceeded (S21: No), a CE dispatch destination is determined including the device 41 for which the lowest priority is set (S31).

(4) Deal with Device Waiting for Notification

Figure 10:
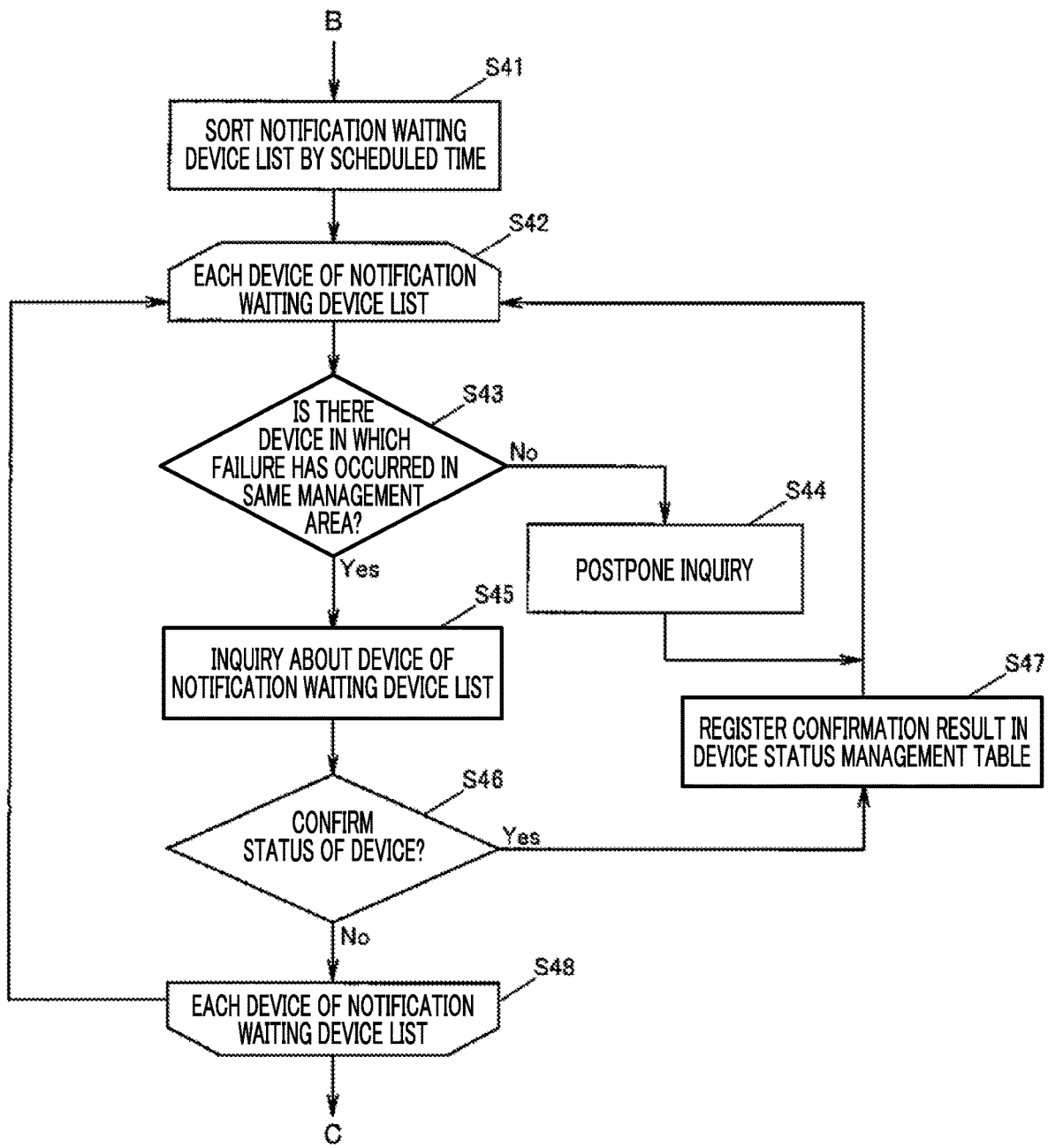
FIG. 10 is a flowchart showing an example of the operation of the information processing apparatus for a device waiting for a notification.

FIG. 10 is a flowchart showing an example of the operation of the information processing apparatus 2 for a device waiting for a notification.

In a case where the required status confirmation list 212 shown in FIG. 8 is empty (S10: Yes), the notification waiting device list 213 is sorted by scheduled time (S41).

Loop processing is performed on the devices waiting for a notification (S42 to S48). That is, it is determined whether or not there is a device 41 in which a failure has occurred in the same management area 4 (S43). If there is no device 41 in which a failure has occurred in the same management area 4 (S43: No), the inquiry about the device 41 is postponed (S44). If there is a device 41 in which a failure has occurred in the same management area 4 (S43: Yes), an inquiry about the device 41 is made (S45). If the status of the device 41 is confirmed (S46: Yes), the status management unit 201 registers the confirmation result in the device status management table 211 (S47). If the status cannot be confirmed (S46: No), the process proceeds to step S1 shown in FIG. 8.

(5) Severity Determination

Figure 11:
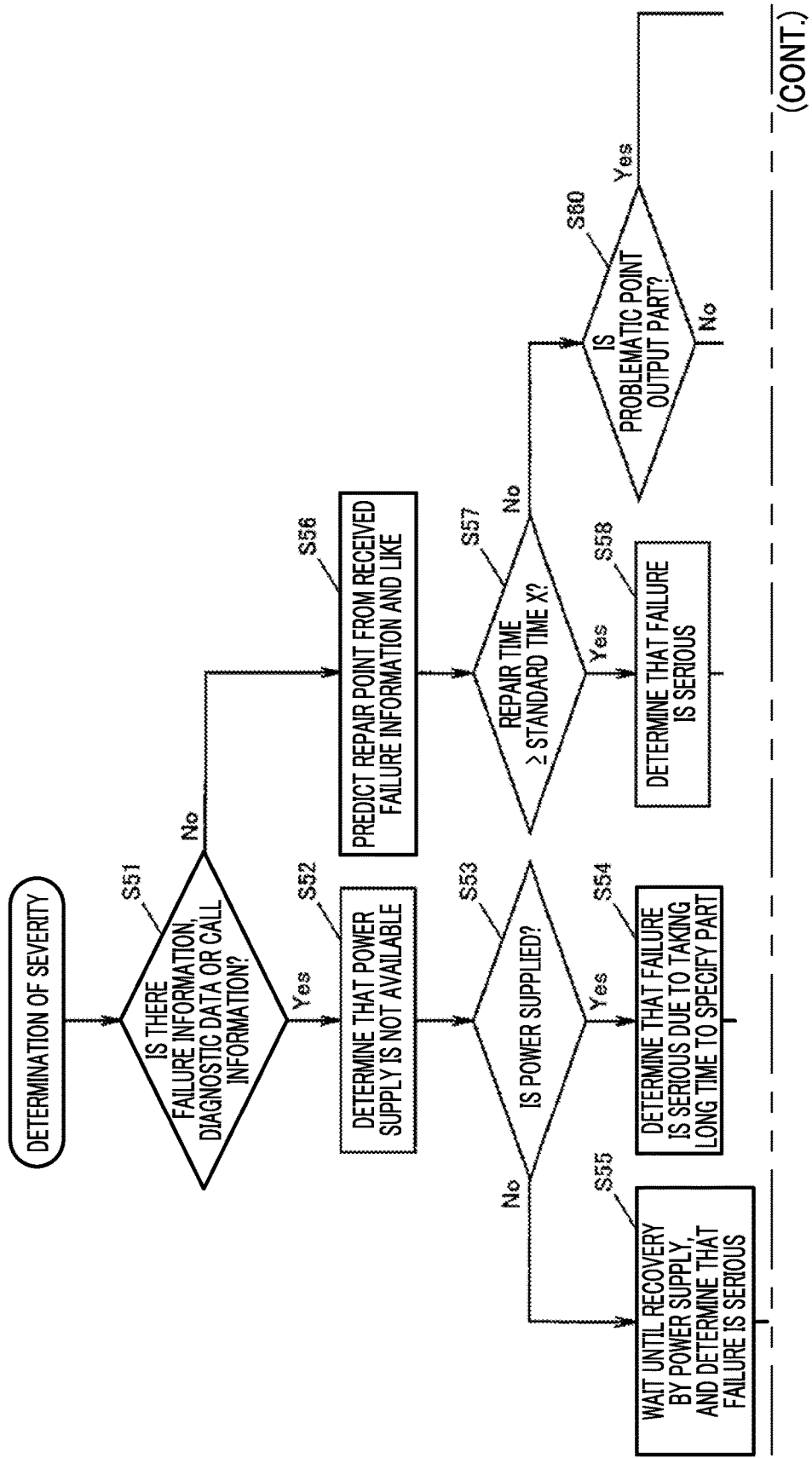
FIG. 11 is a flowchart showing an example of the operation of the information processing apparatus in determination of severity.

FIG. 11 is a flowchart showing an example of the operation of the information processing apparatus 2 in determination of severity. The following severity determination is performed by the priority setting unit 203.

It is determined whether or not there is failure information, diagnostic data or call information (S51). If there is no such information (S51: No), it is determined that the power supply is not available (S52). Next, it is determined whether or not the power is supplied (S53). If the power is supplied (S53: Yes), it takes a long time to specify a part, and therefore it is determined that the failure is serious (S54). If the power is not supplied (S53: No), the process waits until recovery by the power supply, and it is determined that the failure is serious (S55).

In a case where there are various types of information in step S51 (S51: Yes), a repair point is predicted from the received failure information, diagnostic data or call information (S56).

It is determined whether or not the repair time is equal to or greater than a predetermined standard time X (S57). If the repair time is equal to or greater than the standard time X (S57: Yes), it is determined that the degree of failure is severe (S58).

In a case where it is determined that the failure is serious as described above (S54, S55, and S58), the failure recovery priority is set to the lowest priority (S59).

In the above step S57, in a case where the repair time is less than the standard time X (S57: No), it is determined whether or not the problematic point is an output part such as an image output unit (S60). In a case where the problematic point is not the output part (S60: No), it is confirmed that the output part is operating normally (S61). Even in a case where the problematic point cannot be confirmed (S61: No), it is determined that the failure is not serious (S63). In this case, additional information that there is a possibility of additional failure is recorded in a way that the CEs can access. The priority is set to other than the lowest priority, for example, high (S64).

In a case where it is determined in step S60 that the problematic point is an output part (S60: Yes), it is determined that the failure is not serious (S65), and the priority is set to be high (S64).

Example

Figure 12:
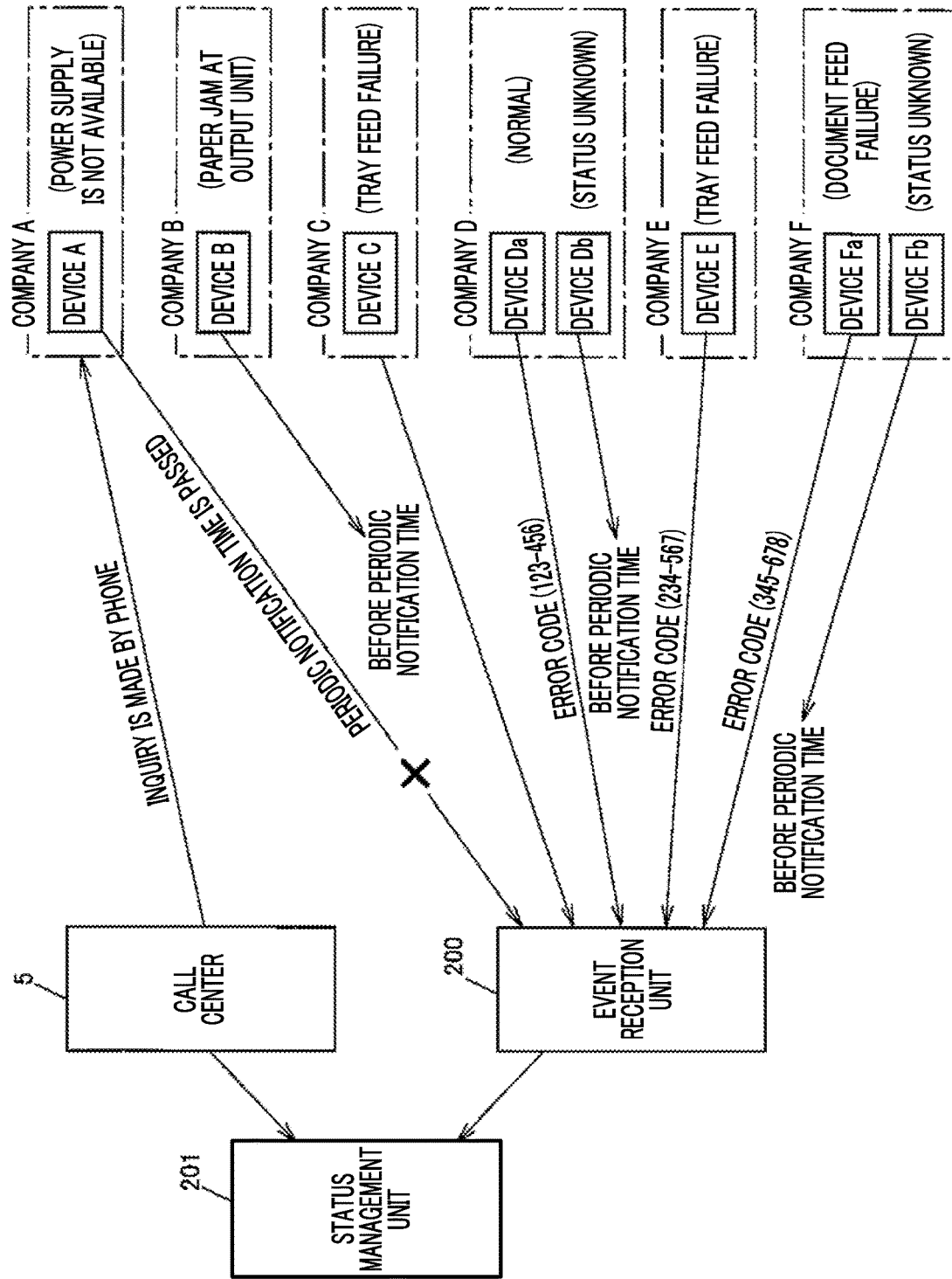
FIG. 12 is a diagram showing an example of the operation of the information processing apparatus according to an example.

FIG. 12 is a diagram showing an example of the operation of the information processing apparatus 2 according to an example.

Companies A to F are companies managing the management area 4. Devices A, B, C, Da, Db, E, Fa, and Fb indicate devices 41 disposed in the management area 4. The contents shown in parentheses near the devices A, B, C, Da, Db, E, Fa, and Fb indicate the contents of the failure. It is assumed that there are two CEs.

The devices 41 belonging to the first group are the devices A, B, Db, and Fb. The devices 41 belonging to the second group are the devices C, Da, E, and Fa.

Among the devices 41 belonging to the first group, the device A has passed the scheduled time of a periodic notification. Therefore, an inquiry is made from the call center 5 by phone and it is confirmed that the power supply is not available.

For the devices C, Da, E, Fa belonging to the second group, it is determined that the amount that can be dealt with by the CEs is exceeded.

The device A is determined to be serious, and the devices C, E, and Fa are determined not to be serious. Because there is the device Fb waiting for a notification in the same office as the device Fa, two CEs are dispatched to the devices C and E.

The devices 41 for which it is not possible to determine how to recover from the failure are the devices B, Db, and Fb. From the fact that no failure has occurred in all devices 41 the scheduled time of a periodic notification in the same office has passed, it is determined that the device Db is likely to have no problem, and the device Db waits for a periodic notification.

For the device B and Fb, inquiries are made to customers, and it is confirmed that the output unit of the device B is in a paper-jam state, but the status of the device Fb cannot be grasped by telephone.

It is determined that the device B for which it is possible to determine how to recover is not serious. Therefore, the device B is designated as a dispatch target after the devices C and E.

The exemplary embodiment of the present disclosure has been described above, but the exemplary embodiment of the present disclosure is not limited to the above embodiment, and various modifications and implementations can be made without departing from the scope of the present disclosure.

The control unit 20 may be configured partially or entirely with a hardware circuit such as a reconfigurable circuit (FPGA: Field Programmable Gate Array) or an application specific integrated circuit (ASIC).

In the range which does not change the gist of this disclosure, it is possible to omit or change a part of components of the above-described embodiment. Within the scope of the present disclosure, steps can be added, deleted, changed, replaced, and the like in the flow of the above embodiment. The program used in the above exemplary embodiment can be provided by being recorded in a computer readable recording medium such as a CD-ROM. Further, the program used in the above exemplary embodiment can be stored in an external server such as a cloud server and can be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An information processing apparatus comprising:
a priority setting unit configured to:
set the lowest failure recovery priority for devices belonging to a first group for which it is not possible to determine how to recover from failures, among devices in which the failures have occurred; and
set a failure recovery priority higher than the lowest failure recovery priority, for devices belonging to a second group for which it is possible to determine how to recover from the failures, among the devices in which the failures have occurred, wherein
a case where it is not possible to determine how to recover from failures means a case when a situation of the failures is not known or a scheduled time of a periodic notification has not been reached,
when the number of devices belonging to the second group exceeds the number of devices that maintenance personnel can immediately deal with, the priority setting unit sets the lowest failure recovery priority for devices among the devices belonging to the second group, and
the number of devices among the devices belonging to the second group corresponds to an excess of the devices belonging to the second group over the number of devices that the maintenance personnel can immediately deal with.

2. The information processing apparatus according to claim 1, wherein when a scheduled time at which a periodic notification is made from a device among the devices belonging to the first group has not reached, the priority setting unit sets, for the device, a failure recovery priority higher than the lowest failure recovery priority.

3. The information processing apparatus according to claim 1, wherein when a scheduled time at which a periodic notification is made from a device among the devices belonging to the first group has not reached, the priority setting unit sets, for the device, a failure recovery priority different from the lowest failure recovery priority.

4. The information processing apparatus according to claim 2, wherein further in a case where a status of the device belonging to the first group cannot to be confirmed, the priority setting unit sets the lowest failure recovery priority for the device.

5. The information processing apparatus according to claim 4, wherein the case where the status of the devices cannot be confirmed is a case where the status of the devices is not confirmed even if maintenance personnel is dispatched.

6. The information processing apparatus according to claim 2, wherein when it is confirmed that there is no other device in which a failure has occurred in the same management area as a device among the devices belonging to the first group, the priority setting unit sets the lowest failure recovery priority for the device.

7. The information processing apparatus according to claim 1, wherein further when severity of a failure of a device belonging to the second group satisfies a predetermined condition, the priority setting unit sets the lowest failure recovery priority for the device.

8. The information processing apparatus according to claim 7, further comprising:
a dispatch unit configured to, when the severity of the failure of the device belonging to the second group does not satisfy the predetermined condition, determine dispatch of maintenance personnel after waiting for a scheduled time of a periodic notification from another device existing in the same management area as the device.

9. The information processing apparatus according to claim 7, wherein the predetermined condition includes a condition that power supply to the devices belonging to the second group is not available.

10. The information processing apparatus according to claim 7, wherein the predetermined condition includes a condition that a recovery time of the device is predicted to be equal to or greater than a predetermined time.

11. The information processing apparatus according to claim 1, wherein when a device belongs to the second group and when a use frequency of the device is equal to or less than a threshold, the priority setting unit sets the lowest failure recovery priority for the device.

12. A non-transitory computer readable medium storing a program causing a computer to execute information processing, the information processing comprising:
setting the lowest failure recovery priority for devices belonging to a first group for which it is not possible to determine how to recover from failures, among devices in which the failures have occurred;
setting a failure recovery priority higher than the lowest failure recovery priority, for devices belonging to a second group for which it is possible to determine how to recover from the failures, among the devices in which the failures have occurred,
wherein a case where it is not possible to determine how to recover from failures means a case when a situation of the failures is not known or a scheduled time of a periodic notification has not been reached; and
when the number of devices belonging to the second group exceeds the number of devices that maintenance personnel can immediately deal with, setting the lowest failure recovery priority for devices among the devices belonging to the second group,
wherein the number of devices among the devices belonging to the second group corresponds to an excess of the devices belonging to the second group over the number of devices that the maintenance personnel can immediately deal with.

13. An information processing apparatus comprising:
priority setting means for:
setting the lowest failure recovery priority for devices belonging to a first group for which it is not possible to determine how to recover from failures, among devices in which the failures have occurred;
setting a failure recovery priority higher than the lowest failure recovery priority, for devices belonging to a second group for which it is possible to determine how to recover from the failures, among the devices in which the failures have occurred,
wherein a case where it is not possible to determine how to recover from failures means a case when a situation of the failures is not known or a scheduled time of a periodic notification has not been reached;
when the number of devices belonging to the second group exceeds the number of devices that maintenance personnel can immediately deal with, setting the lowest failure recovery priority for devices among the devices belonging to the second group,
wherein the number of devices among the devices belonging to the second group corresponds to excess of the devices belonging to the second group over the number of devices that the maintenance personnel can immediately deal with.

* * * * *